Oct. 19, 1937.   A. E. WINDSON   2,096,078
DOG EXERCISER
Filed Sept. 4, 1935
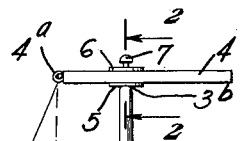
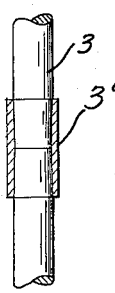
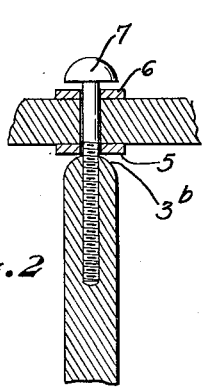
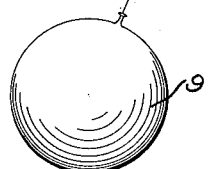
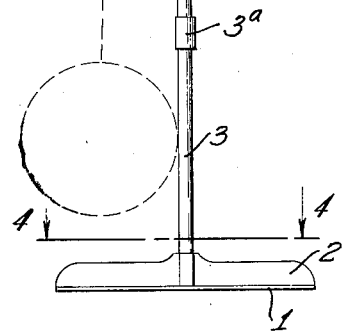
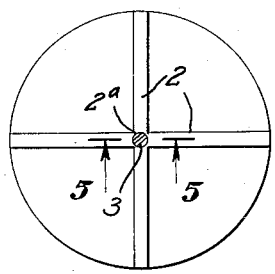
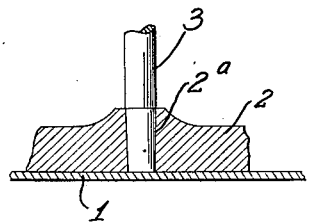
Inventor
Antoine E. Windson
A. B. Bowman
Attorney Patented Oct. 19, 1937

2,096,078

UNITED STATES PATENT OFFICE 2,096,078

DOG EXERCISER

Antoine E. Windson, La Jolla, Calif.

Application September 4, 1935, Serial No. 39,108

1 Claim. (Cl. 119—29)

My invention relates to a dog exerciser, more particularly a device for dogs to play with so that they will get sufficient exercise, and the objects of my invention are:

First, to provide a device for the amusement of a dog so that a dog's desire to play will give him ample exercise in connection with the device;

Second, to provide a device of this class which tends to make the dog play and take exercise;

Third, to provide a device of this class which is applicable for all types and kinds of dogs;

Fourth, to provide a dog exerciser of this class which is collapsible and may be packed in a small package for transportation or storage;

Fifth, to provide a device of this class which may be operated in a very small space to give a dog ample exercise; and Sixth, to provide a device of this class which is very simple and economical of construction, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claim, reference being had to the accompanying drawing and to the characters of reference thereon which form a part of this application, in which:

Figure 1 is a side elevational view of my dog exerciser complete and ready for operation; Fig. 2 is an enlarged sectional view along the line 2—2 of Fig. 1; Fig. 3 is an enlarged sectional view along the line 3—3 of Fig. 1 showing some of the parts in elevation to facilitate the illustration; Fig. 4 is a sectional view through 4—4 of Fig. 1, and Fig. 5 an enlarged sectional view of a fragmentary portion along the line 5—5 of Fig. 4.

Similar characters of reference refer to similar parts and portions throughout the several views of the drawing.

The base member 1, base reinforcing 2, post 3, revoluble arm 4, washers 5 and 6, screw 7, cord 8, and air bag or balloon 9, constitute the principal parts and portions of my dog exerciser.

The base member 1 is a relatively thin disk like member of suitable size to provide a support for the exerciser. It is provided on its upper side with a plurality of reinforcing strips 2. In this case I have shown four. These are secured to the upper side of the base member and extend to near the center and leave a circular downwardly tapering opening 2a at the central portion which is adapted to receive the lower end of the post 3. This post 3 is preferably made of wood but may be made of tubing and is made in a plurality of sections. In this case I have shown three sections secured together at their ends by sleeve members 3a which taper toward their middle portions so that the members 3 are wedged therein and form a tight fit; thus providing means for readily collapsing the post member, and the lower member 3 may be readily removed from the base member. The upper end of the upper member 3 is provided with a rounded portion 3b and mounted on the upper end of this rounded member 3b is a washer 5 which is preferably a metal washer. On this metal washer 5 is mounted the revoluble arm member 4 and on the upper side of the revoluble arm member 4 is another washer 6. The washer 6, arm member 4 and washer 5 are provided with holes which conform and receive the screw 7 which is screwed into the upper end of the upper post member 3, as shown best in Fig. 2 of the drawing, thus providing a pivotal support for the revoluble arm member 4 so that it will freely and readily revolve at the upper end of the post 3. The upper end of the post or standard 3 is preferably rounded to provide a bearing surface of a diameter substantially the same as that of the bore of the lower washer 5 and the top face of the upper washer 6 is slightly spaced from the head of the screw or pivot pin 7. This construction and arrangement will thereby reduce retarding of rotation of the arm member 4 to a minimum. This revoluble arm member 4 is provided with a loop member 4a in one end which is adapted to support the one end of the cord 8. The other end from the loop 4a of the member 4 is longer to provide a counterbalance for the cord and an air bag or balloon 9.

It will be noted that this extended end may be weighted to provide a balance for the two ends including the cord and air bag.

Secured on the free end of the cord 8 is an air bag 9 which is very light so that it will readily rise in the air supported at times by the cord 8 so that when the dog plays with it it rises and lowers and bounds inwardly and outwardly in all directions around the post 3 and base member 1 and causes amusement for the dog who will play with it continuously for an hour or more at a time. It will be observed that the sphere-like member 9 has its radius corresponding to the distance between the axis of the standard or post and the point of connection of the suspension cord 8 to the revoluble arm 4, whereby the suspension means will lie in an approximately vertical position when the balloon is in a state of rest. Further, the member is positioned substantially at a heighth from the ground, whereby the animal standing on the ground may strike the member with its head or portion of its body.

It will be here noted that the structure disclosed has been made of wood, but all the parts may be made of metal.

The member 4 will revolve freely on the upper end of the post 3 which gives free movement of the air bag 9 in all directions, inwardly and outwardly, upwardly and downwardly, and surrounding the post 3.

It will also be noted that the post 3 is readily removable from the base 1 and that the post 3 is divided into sections which are readily separable into short sections; that the members 4, 5 and 6 may be readily removed by removing the screw 7, so that the whole structure may be readily placed in compact form for transportation or storage.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

In a dog exerciser comprising a base, a vertical standard having a rounded upper end, a headed vertical pivot pin centrally positioned in the upper end of the standard, upper and lower washers, the lower washer being engageable with the rounded upper end of the standard, a horizontally swingable supporting bar freely mounted on the pivot pin and positioned between the washers, the upper end of the standard being rounded to provide a bearing surface of a diameter substantially the same as that of the bore of the lower washer, the top face of the upper washer being slightly spaced from the head of the pivot pin to thereby reduce retarding of rotation of the horizontally swingable bar to a minimum, said bar having a portion thereof on one side of the standard of shorter length than the portion thereof on the other side of the standard, suspension means connected to the free end of the arm of shorter length, and a sphere-like member secured to the lower end of the suspension means, the radius of the sphere-like member corresponding to the distance between the axis of the standard and the point of connection of the suspension means to the support whereby the suspension means will lie in an approximately vertical position when the sphere-like member is in a state of rest, said sphere-like member being positioned substantially at a heighth from the supporting surface of the base whereby an animal standing on the supporting surface or base may strike its head or portion of its body against said spherical member.

ANTOINE E. WINDSON.